(12) United States Patent
Hellring et al.

(10) Patent No.: US 10,964,949 B2
(45) Date of Patent: *Mar. 30, 2021

(54) ELECTRODE BINDER COMPOSITION FOR LITHIUM ION ELECTRICAL STORAGE DEVICES

(71) Applicant: PPG Industries Ohio, Inc., Cleveland, OH (US)

(72) Inventors: Stuart D. Hellring, Pittsburgh, PA (US); Randy E. Daughenbaugh, Monroeville, PA (US); Shanti Swarup, Allison Park, PA (US); Ellor James Van Buskirk, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 158 days.

This patent is subject to a terminal disclaimer.

(21) Appl. No.: 16/013,615

(22) Filed: Jun. 20, 2018

(65) Prior Publication Data

US 2018/0301705 A1 Oct. 18, 2018

Related U.S. Application Data

(63) Continuation of application No. 15/196,185, filed on Jun. 29, 2016, now Pat. No. 10,033,043, which is a continuation of application No. 14/242,126, filed on Apr. 1, 2014, now Pat. No. 9,385,374.

(51) Int. Cl.

| | |
|---|---|
| *H01M 4/62* | (2006.01) |
| *H01M 4/04* | (2006.01) |
| *H01M 4/58* | (2010.01) |
| *H01M 4/139* | (2010.01) |
| *H01M 4/1391* | (2010.01) |
| *H01M 10/056* | (2010.01) |
| *H01M 10/0569* | (2010.01) |
| *C09D 127/16* | (2006.01) |
| *H01M 4/136* | (2010.01) |
| *H01M 4/66* | (2006.01) |
| *H01M 10/0525* | (2010.01) |
| *H01M 4/131* | (2010.01) |

(52) U.S. Cl.
CPC .......... *H01M 4/623* (2013.01); *C09D 127/16* (2013.01); *H01M 4/0404* (2013.01); *H01M 4/0409* (2013.01); *H01M 4/131* (2013.01); *H01M 4/136* (2013.01); *H01M 4/139* (2013.01); *H01M 4/1391* (2013.01); *H01M 4/5825* (2013.01); *H01M 4/622* (2013.01); *H01M 4/625* (2013.01); *H01M 4/661* (2013.01); *H01M 10/056* (2013.01); *H01M 10/0525* (2013.01); *H01M 10/0569* (2013.01); *H01M 2300/0025* (2013.01); *H01M 2300/0028* (2013.01); *Y02E 60/10* (2013.01)

(58) Field of Classification Search
CPC .... C08F 220/06; C08F 220/14; C08F 220/20; C08F 2220/1825; C08F 2220/1858; C09D 127/16; C08L 33/06; H01M 10/0525; H01M 10/056; H01M 10/0569; H01M 2300/0025; H01M 2300/0028; H01M 4/0404; H01M 4/0409; H01M 4/131; H01M 4/139; H01M 4/1391; H01M 4/5825; H01M 4/622; H01M 4/623; H01M 4/625; H01M 4/661; Y02E 60/122

See application file for complete search history.

(56) References Cited

U.S. PATENT DOCUMENTS

| | | |
|---|---|---|
| 3,716,599 A | 2/1973 | Vasta et al. |
| 4,039,497 A | 8/1977 | Troussier et al. |
| 4,309,328 A | 1/1982 | Carson et al. |
| 4,314,004 A | 2/1982 | Stoneberg |
| 4,379,885 A | 4/1983 | Miller et al. |
| 5,349,003 A | 9/1994 | Kato et al. |
| 5,464,897 A | 11/1995 | Das et al. |
| 5,776,637 A | 7/1998 | Kashio et al. |
| 6,037,080 A | 3/2000 | Kronfli et al. |
| 6,083,644 A | 7/2000 | Watanabe et al. |
| 6,159,635 A | 12/2000 | Dasgupta et al. |
| 6,228,533 B1 | 5/2001 | Ohashi et al. |
| 6,231,626 B1 | 5/2001 | Yoshida et al. |
| 6,294,290 B1 | 9/2001 | Kim |
| 6,531,541 B1 | 3/2003 | Desai et al. |
| 6,656,633 B2 | 12/2003 | Yamakawa et al. |
| 6,756,153 B1 | 6/2004 | Yamamoto et al. |
| 6,770,397 B1 | 8/2004 | Maeda et al. |
| 6,881,517 B1 | 4/2005 | Kanzaki et al. |
| 7,282,528 B2 | 10/2007 | Asano et al. |
| 7,316,864 B2 | 1/2008 | Nakayama et al. |
| 7,351,498 B2 | 4/2008 | Watarai et al. |
| 7,625,973 B2 | 12/2009 | Ambrose et al. |
| 7,659,335 B2 | 2/2010 | Konabe |
| 7,758,998 B2 | 7/2010 | Ohata et al. |
| 7,820,328 B1 | 10/2010 | Takeuchi et al. |
| 7,931,985 B1 | 4/2011 | Muthu et al. |
| 7,951,491 B2 | 5/2011 | Tokunaga et al. |
| 7,956,144 B2 | 6/2011 | Lindow et al. |
| 7,981,543 B2 | 7/2011 | Kim et al. |
| 8,093,327 B2 | 1/2012 | Ambrose et al. |
| 8,277,977 B2 | 10/2012 | Tsuchiya et al. |
| 8,486,363 B2 | 7/2013 | Hung et al. |
| 8,486,364 B2 | 7/2013 | Vanier et al. |

(Continued)

FOREIGN PATENT DOCUMENTS

| | | |
|---|---|---|
| EP | 0275944 A2 | 7/1988 |
| EP | 0483887 A2 | 5/1992 |

(Continued)

*Primary Examiner* — Carlos Barcena
(74) *Attorney, Agent, or Firm* — Charles M. Yeomans

(57) ABSTRACT

An electrode binder of a lithium ion battery comprising:
(a) a polyvinylidene binder dispersed in an organic diluent with
(b) a (meth)acrylic polymer dispersant.

The binder can be used in the assembly of electrodes of lithium ion batteries.

23 Claims, No Drawings

(56) References Cited

U.S. PATENT DOCUMENTS

| | | |
|---|---|---|
| 8,564,933 B2 | 10/2013 | Sasaki |
| 2005/0170248 A1 | 8/2005 | Zhang et al. |
| 2005/0221186 A1 | 10/2005 | Shimizu et al. |
| 2008/0038447 A1 | 2/2008 | Tu |
| 2008/0264864 A1 | 10/2008 | Dadalas et al. |
| 2009/0318618 A1 | 12/2009 | Mori et al. |
| 2010/0239910 A1 | 9/2010 | Tode et al. |
| 2010/0304270 A1 | 12/2010 | Amin-Sanayei et al. |
| 2011/0123863 A1 | 5/2011 | Choi et al. |
| 2011/0179637 A1 | 7/2011 | Eberman et al. |
| 2012/0015246 A1 | 1/2012 | Amin-Sanayei et al. |
| 2012/0177991 A1 | 7/2012 | Mogi et al. |
| 2012/0309892 A1 | 12/2012 | Ootsuka et al. |
| 2013/0052530 A1 | 2/2013 | Kitaguchi et al. |
| 2013/0209875 A1 | 8/2013 | Maegawa et al. |
| 2013/0252077 A1 | 9/2013 | Iwasaki et al. |
| 2013/0260241 A1 | 10/2013 | Sone et al. |
| 2013/0280606 A1 | 10/2013 | Sekine |
| 2013/0316234 A1 | 11/2013 | Momose et al. |

FOREIGN PATENT DOCUMENTS

| | | |
|---|---|---|
| JP | 2000357505 A | 12/2000 |
| JP | 2002260666 A1 | 9/2002 |
| JP | 2012028225 A | 2/2012 |
| WO | 1997027260 A1 | 7/1997 |
| WO | 0049103 A1 | 8/2000 |
| WO | 2008002747 A1 | 1/2008 |
| WO | 2008140690 A1 | 11/2008 |
| WO | 2012091001 A1 | 7/2012 |
| WO | 2012093689 A1 | 7/2012 |
| WO | 2013010936 A1 | 1/2013 |

ELECTRODE BINDER COMPOSITION FOR LITHIUM ION ELECTRICAL STORAGE DEVICES

CROSS-REFERENCE TO RELATED APPLICATIONS

This application is a continuation of U.S. patent application Ser. No. 15/196,185, filed Jun. 29, 2016, now allowed, which is a continuation of U.S. patent application Ser. No. 14/242,126, filed Apr. 1, 2014, now U.S. Pat. No. 9,385,374, issued Jul. 5, 2016.

FIELD OF THE INVENTION

The invention relates to fluoropolymer, and preferably polyvinylidene fluoride (PVDF), compositions for manufacturing electrodes for use in electrical storage devices, such as batteries. The compositions contain PVDF, binder, organic solvent and one or more electrode-forming materials.

BACKGROUND OF THE INVENTION

There is a trend in the electronics industry to produce smaller devices, powered by smaller and lighter batteries. Batteries with a negative electrode—such as a carbonaceous material, and a positive electrode—such as lithium metal oxides can provide relatively high power and low weight.

Polyvinylidene fluoride, because of its excellent electrochemical resistance, has been found to be a useful binder for forming electrodes to be used in electrical storage devices. Typically, the polyvinylidene is dissolved in an organic solvent and the electrode material, that is, the electrical active lithium compound and a carbonaceous material, is combined with the PVDF solution to form a slurry that is applied to a metal foil or mesh to form the electrode.

The role of the organic solvent is to dissolve PVDF in order to provide good adhesion between the electrode material particles and the metal foil or mesh upon evaporation of the organic solvent. Currently, the organic solvent of choice is N-methyl-2-pyrrolidone (NMP). PVDF binders dissolved in NMP provide superior adhesion and an interconnectivity of all the active ingredients in the electrode composition. The bound ingredients are able to tolerate large volume expansion and contraction during charge and discharge cycles without losing interconnectivity within the electrodes. Interconnectivity of the active ingredients in an electrode is extremely important in battery performance, especially during charging and discharging cycles, as electrons must move across the electrode, and lithium ion mobility requires interconnectivity within the electrode between particles.

Unfortunately, NMP is a toxic material and presents health and environmental issues. It would be desirable to replace NMP as a solvent for PVDF binders. However, NMP is somewhat unique in its ability to dissolve PVDF that is not nearly as soluble in other organic solvents.

To effectively employ PVDF compositions in electrode-forming processes in organic solvent other than NMP, the PVDF must be dispersed in the diluent. However, the dispersion must be compatible with current manufacturing practices and provide desired properties of the intermediate and final products. Some common criteria include: a) stability of the fluoropolymer dispersion, having sufficient shelf-life, b) stability of the slurry after admixing the electroconductive powders with the dispersion, c) appropriate viscosity of the slurry to facilitate good application properties, and d) sufficient interconnectivity within the electrode.

In addition, after the electrodes are assembled in an electrical storage device, the device should be substantially free of moisture and substantially free of hydrophilic groups that may attract moisture.

Stable PVDF dispersions for use in preparing electrode-forming compositions have now been found for producing high quality electrodes for batteries and other electrical storage devices having interconnectivity.

SUMMARY OF THE INVENTION

The present invention provides an electrode binder of a lithium ion secondary battery comprising:
  (a) a polyvinylidene fluoride polymer dispersed in an organic diluent with
  (b) a (meth)acrylic polymer dispersant.

The invention also provides an electrode slurry for a lithium ion secondary battery comprising:
  (a) an electrically active material capable of lithium intercalation/deintercalation,
  (b) the above-described binder, and
  (c) a conductive agent.

The invention further provides an electrode comprising:
  (a) an electrical current collector;
  (b) a cured film formed on the collector (a) comprising:
    (i) a polyvinylidene fluoride polymer,
    (ii) a crosslinked (meth)acrylic polymer,
    (iii) a conductive material, and
    (iv) an electrode active material capable of lithium intercalation/deintercalation.

The invention also provides an electrical storage device comprising:
  (a) the above-described electrode,
  (b) a counter electrode, and
  (c) an electrolyte.

DETAILED DESCRIPTION

As used herein, unless otherwise expressly specified, all numbers such as those expressing values, ranges, amounts or percentages may be read as if prefaced by the word "about", even if the term does not expressly appear. Moreover, it should be noted that plural terms and/or phrases encompass their singular equivalents and vice versa. For example, "a" polymer, "a" crosslinker, and any other component refer to one or more of these components.

When referring to any numerical range of values, such ranges are understood to include each and every number and/or fraction between the stated range minimum and maximum.

As used herein, the term "polymer" refers broadly to oligomers and both homopolymers and copolymers. The term "resin" is used interchangeably with "polymer".

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_2$ substituted acrylic acids, such as methacrylic acid, ethacrylic acid, etc., and their $C_1$-$C_4$ alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer. The term "(meth)acrylic polymer" refers to polymers prepared from one or more (meth)acrylic monomers.

As used herein molecular weights are determined by gel permeation chromatography using a polystyrene standard. Unless otherwise indicated molecular weights are on a weight average basis.

The term "glass transition temperature" is a theoretical value being the glass transition temperature as calculated by the method of Fox on the basis of monomer composition of the monomer charge according to T. G. Fox, Bull. Am. Phys. Soc. (Ser. II) 1, 123 (1956) and J. Brandrup, E. H. Immergut, Polymer Handbook 3$^{rd}$ edition, John Wiley, New York, 1989.

The "vinylidene fluoride polymer" (PVDF) used herein includes both normally high molecular weight homopolymers, copolymers, and terpolymers within its meaning. Such copolymers include those containing at least 50 mole percent, such as at least 75 mole %, and at least 80 mole %, and at least 85 mole % of vinylidene fluoride that may be copolymerized with at least one comonomer selected from the group consisting of tetrafluoroethylene, trifluoroethylene, chlorotrifluoroethylene, hexafluoropropene, vinyl fluoride, pentafluoropropene, tetrafluoropropene, perfluoromethyl vinyl ether, perfluoropropyl vinyl ether and any other monomer that would readily copolymerize with vinylidene fluoride.

The PVDF is typically a high molecular weight polymer having a weight average molecular weight of at least 50,000, typically from 100,000 to 1,000,000. PVDF is commercially available from Arkema under the trademark KYNAR and from Inner Mongolia Wanhao Fluorochemical Co., Ltd.

The (meth)acrylic polymer dispersant is prepared by polymerizing a mixture of alpha, beta-ethylenically unsaturated (meth)acrylic monomers which includes an alpha, beta-ethylenically unsaturated carboxylic acid and at least one other different copolymerizable ethylenically unsaturated monomer such as a copolymerizable ethylenically unsaturated monomer containing hydroxyl groups.

Generally, the alpha, beta-ethylenically unsaturated carboxylic acid constitutes from 2 to 50, more preferably 2 to 20 percent by weight of the polymeric product; the percentage being based on total weight of polymerizable monomers used in preparing the polymeric product. The alpha, beta-ethylenically unsaturated carboxylic acids provide stability to the dispersion.

Examples of alpha, beta-ethylenically unsaturated carboxylic acids are those containing up to 10 carbon atoms such as acrylic acid and methacrylic acid. Examples of other unsaturated acids are alpha, beta-ethylenically unsaturated dicarboxylic acids such as maleic acid or its anhydride, fumaric acid and itaconic acid. Also, the half esters of these dicarboxylic acids may be employed.

Examples of alpha, beta-ethylenically unsaturated monomers, which are different from and are copolymerizable with the alpha, beta-ethylenically unsaturated carboxylic acids mentioned above, are alkyl esters of (meth)acrylic acid containing from 1 to 3 carbon atoms in the alkyl group such as methyl methacrylate. These monomers can be used in amounts up to 98 percent by weight, typically 30 to 96 percent by weight such as 30-90 percent by weight based on total monomer weight.

Examples of other alpha, beta-ethylenically unsaturated copolymerizable monomers are 1-18 carbon alkyl (meth) acrylates. Specific examples of suitable unsaturated monomers of this type include butyl methacrylate, hexyl methacrylate, octyl methacrylate, isodecyl methacrylate, stearyl methacrylate, methyl acrylate, ethyl acrylate, butyl acrylate, hexyl acrylate, 2-ethylhexyl acrylate, octyl acrylate, decyl acrylate and dodecyl acrylate. These monomers can be used in amounts up to 70 percent by weight, typically 2 to 60 percent by weight based on total monomer weight.

Besides the alkyl esters of alpha, beta-ethylenically unsaturated carboxylic acids mentioned above, substituted alkyl esters, for example, hydroxyalkyl esters such as hydroxyethyl and hydroxypropyl (meth)acrylate can also be used. These monomers can be used in amounts up to 30 percent by weight, typically at least 2 percent by weight such as 2 to 20 percent by weight based on total monomer weight. Hydroxyalkyl esters are usually present when the binder composition contains separately added crosslinking agent that is reactive with carboxylic acid and/or hydroxyl groups such as an aminoplast, polyepoxides and blocked polyisocyanates or crosslinking agents using self-crosslinking monomers that have groups that are reactive with the carboxylic acid and/or hydroxyl groups or with themselves, such as N-alkoxymethyl amide groups that are associated with N-alkoxymethyl (meth)acrylamide monomers. Examples of such monomers are N-butoxymethyl (meth) acrylamide and N-isopropoxymethyl (meth)acrylamide. Also, crosslinking monomers containing blocked isocyanate groups can be used. Examples of such monomers include isocyanatoethyl (meth)acrylate in which the isocyanato group is reacted ("blocked") with a compound that unblocks at curing temperature. Examples of suitable blocking agents include epsilon-caprolactone and methylethyl ketoxime. The crosslinking monomers, if used, are typically present in amounts up to 30 percent by weight, such as 2 to 30 percent by weight based on total monomer weight.

Examples of other alpha, beta-ethylenically unsaturated monomers are vinyl aromatic compounds such as styrene, alpha-methyl styrene, alpha-chlorostyrene and vinyl toluene; organic nitriles such as acrylonitrile and methacrylonitrile; allyl monomers such as allyl chloride and allyl cyanide and monomeric dienes such as 1,3-butadiene and 2-methyl-1,3-butadiene. These other monomers, if present, are present in amounts of up to 30 percent by weight, such as 2 to 20 percent by weight based on total monomer weight.

The monomers and relative amounts are typically selected such that the resulting (meth)acrylic polymer has a Tg of 100° C. or less, typically from −50 to +70° C. Lower Tg that is below 0° C. are desirable to insure for battery performance at low temperature.

Acid group-containing acrylic polymers are usually prepared by conventional free radical initiated solution polymerization techniques in which the polymerizable monomers are dissolved in a solvent or a mixture of solvents and polymerized in the presence of a free radical initiator until conversion is complete.

Examples of free radical initiators are those which are soluble in the mixture of monomers such as azobisisobutyronitrile, azobis(alpha, gamma-methylvaleronitrile), tertiary-butyl perbenzoate, tertiary-butyl peracetate, benzoyl peroxide, ditertiary-butyl peroxide and tertiary amyl peroxy 2-ethylhexyl carbonate.

Optionally, a chain transfer agent which is soluble in the mixture of monomers such as alkyl mercaptans, for example, tertiary-dodecyl mercaptan; ketones such as methyl ethyl ketone, chlorohydrocarbons such as chloroform can be used. A chain transfer agent provides control over the molecular weight to give products having required viscosity for various coating applications. Tertiary-dodecyl mercaptan is preferred because it results in high conversion of monomer to polymeric product.

To prepare the acid group-containing (meth)acrylic polymer, the solvent is first heated to reflux and the mixture of polymerizable monomers containing the free radical initiator is added slowly to the refluxing solvent. The reaction mixture is held at polymerizing temperatures so as to reduce the free monomer content to below 1.0 and usually below 0.5 percent.

For use in the process of the invention, the acid group-containing (meth)acrylic polymers prepared as described above should preferably have a weight average molecular weight of about 5000 to 500,000, such as 10,000 to 100,000, and 25,000 to 50,000.

The acid group-containing (meth)acrylic polymer serves as a dispersant for a PVDF. Typically, the PVDF is added to the organic diluent containing the (meth)acrylic polymer dispersant with low shear mixing to form the electrode binder.

Besides the PVDF and the (meth)acrylic polymer dispersant, the electrode binder can also contain a separately added crosslinking agent for the (meth)acrylic polymer dispersant. The crosslinking agent should be soluble or dispersible with the diluent and be reactive with the carboxylic acid groups and the hydroxyl groups, if present, associated with the (meth)acrylic polymer. Suitable crosslinking agents are aminoplast resins, blocked polyisocyanates and polyepoxides.

Examples of aminoplast resins are those which are formed by reacting a triazine such as melamine or benzoguanamine with formaldehyde. These reaction products contain reactive N-methylol groups. Usually, these reactive groups are etherified with methanol, ethanol, butanol including mixtures thereof to moderate their reactivity. For the chemistry preparation and use of aminoplast resins, see "The Chemistry and Applications of Amino Crosslinking Agents or Aminoplast", Vol. V, Part II, page 21 ff., edited by Dr. Oldring; John Wiley & Sons/Cita Technology Limited, London, 1998. These resins are commercially available under the trademark MAPRENAL® such as MAPRENAL MF980 and under the trademark CYMEL® such as CYMEL 303 and CYMEL 1128, available from Cytec Industries.

Blocked polyisocyanate crosslinking agents are typically diisocyanates such as toluene diisocyanate, 1,6-hexamethylene diisocyanate and isophorone diisocyanate including isocyanato dimers and trimers thereof in which the isocyanate groups are reacted ("blocked") with a material such as epsilon-caprolactone and methylethyl ketoxime. At curing temperatures, the blocking agents unblock exposing isocyanate functionality that is reactive with the hydroxyl functionality associated with the (meth)acrylic polymer. Blocked polyisocyanate crosslinking agents are commercially available from Bayer as DESMODUR BL.

Examples of polyepoxide crosslinking agents are epoxy-containing (meth)acrylic polymers such as those prepared from glycidyl methacrylate copolymerized with other vinyl monomers, polyglycidyl ethers of polyhydric phenols such as the diglycidyl ether of bisphenol A; and cycloaliphatic polyepoxides such as 3,4-epoxycyclohexylmethyl-3,4-epoxycyclohexane carboxylate and bis(3,4-epoxy-6-methylcyclohexyl-methyl) adipate.

Crosslinking agents, including those associated with crosslinking monomers and separately added crosslinking agents, are desirable because they react with the hydrophilic, carboxylic acid and/or hydroxyl groups, if present, preventing these groups from absorbing moisture that could be problematic in a lithium ion secondary battery.

As mentioned above, the electrode binder is typically prepared by adding the PVDF to the organic diluent containing the (meth)acrylic polymer dispersant and the crosslinking agent, if present, with low shear mixing until a stable dispersion is formed. The dispersion typically has a resin solids content of from 30 to 80, usually 40 to 70 percent by weight. The PVDF is usually present in the dispersion in amounts of 45 to 96, typically 50 to 90 percent by weight; the (meth)acrylic polymer dispersant is usually present in amounts of 2 to 20, typically 5 to 15 percent by weight, and the separately added crosslinker is usually present in amounts of up to 15, typically 1 to 15 percent by weight, the percentage by weight being based on weight of resin solids. The organic diluent is present in the dispersion in amounts of 20 to 80, such as 30 to 70 percent by weight based on total weight of the dispersion. Examples of organic diluents are ketones such as methyl ethyl ketone, cyclohexanone, isophorone, acetophenone and ethers such as the $C_1$ to $C_4$ alkyl ethers of ethylene and propylene glycol.

To prepare an electrode for a lithium ion electrical storage device, an electrically active material capable of lithium ion intercalation (deintercalation), a conductive agent, the electrode binder dispersion, including crosslinking agent, additional organic diluent if needed, and optional ingredients are combined to form a slurry. During discharge, lithium ions are released from the negative electrode and carry the current to the positive electrode in a process known as deintercalation. During charging, the lithium ions migrate from the positive electrode to the negative electrode where they become embedded in the electrode in a process known as intercalation.

The material constituting the active material particles contained in the slurry for positive electrodes is not particularly limited and a suitable material can be selected according to the type of an electrical storage device of interest. However, the active material particles contained in the slurry for positive electrodes which is manufactured by using the binder composition for positive electrodes of the present invention are typically electrically active lithium compounds capable of lithium intercalation/deintercalation. Examples are lithium atom-containing oxides and phosphates such as $LiCoO_2$, $LiNiO_2$, $LiFePO_4$, $LiCoPO_4$, $LiMnO_2$, $LiMn_2O_4$, $Li(NiMnCo)O_2$, $Li(NiCoAl)O_2$, carbon-coated $LiFePO_4$, and mixtures thereof.

The electrically active lithium compound is usually present in the slurry in amounts of 45 to 95, typically 50 to 90 percent by weight based on total solids weight of the slurry.

The electrode slurry contains other components as required in addition to the above components. The other components include a conductivity providing agent, the binder and optionally a thickener.

Examples of the above conductivity providing agent include carbonaceous materials. Examples of the carbonaceous materials include graphite, activated carbon, acetylene black, furnace black, graphite, carbon fibers and fullerene. Out of these, acetylene black or furnace black can be used. The conductivity providing agent is usually present in the slurry in amounts of 2 to 20, typically 5 to 10 percent by weight based on total solids weight of the slurry.

The binder is present in the slurry in amounts of 2 to 20, typically 5 to 10 percent by weight solids based on total solids weight of the slurry.

The organic diluent is typically present in amounts of 30 to 90 percent, such as 40 to 80 percent by weight based on total weight of the slurry.

The electrode slurry can be manufactured by mixing together the electrically active lithium compound, the binder including crosslinker, the conductive material, additional organic diluent if necessary, and optional additives. These substances can be mixed together by agitation with a known means such as stirrer, bead mill or high-pressure homogenizer.

As for mixing and agitation for the manufacture of the electrode slurry, a mixer capable of stirring these components to such an extent that an agglomerate of the active material particles does not remain in the slurry as well as necessary and satisfactory dispersion conditions must be selected. The degree of dispersion can be measured with a particle gauge; and mixing and dispersion are preferably carried out to ensure that agglomerates of 100 millimicrons or more are not present. Examples of the mixer which meets this condition include ball mill, sand mill, pigment disperser, grinding machine, ultrasonic disperser, homogenizer, planetary mixer and Hobart mixer.

The electrode can be manufactured by applying the above slurry to the surface of a suitable current collector such as metal foil or mesh to form a coating film and curing the coating film.

The current collector is not particularly limited if it is made of a conductive material. In a lithium ion secondary battery, a current collector made of a metal such as iron, copper, aluminum, nickel or stainless steel is used. Typically, aluminum or copper in sheet or mesh form is used.

Although the shape and thickness of the current collector are not particularly limited, the current collector is preferably like a sheet having a thickness of about 0.001 to 0.5 mm.

The method of applying the slurry to the current collector is not particularly limited. The slurry may be applied by doctor blade coating, dip coating, reverse roll coating, direct roll coating, gravure coating, extrusion coating, immersion or brushing. Although the application quantity of the slurry is not particularly limited, the thickness of the active material layer formed after the liquid medium is removed is typically 25 to 150 microns (µm), such as 30 to 125 µm.

The method of curing or crosslinking the coating film after application can be done by heating at elevated temperature, such as at least 150° C., for example, at least 200° C., such as 225-300° C. The time of heating will depend somewhat on the temperature. Generally, higher temperatures require less time for curing. Typically, curing times are for at least 15 minutes, such as 15 to 60 minutes. The curing temperature and time should be sufficient such that the (meth)acrylic polymer in the cured film is crosslinked, that is, covalent bonds are formed between coreactive groups on the (meth)acrylic polymer chain, such as the carboxylic acid groups and the hydroxyl groups and the N-methylol and/or the N-methylol ether groups of the aminoplast, or in the case of a self-curing (meth)acrylic polymer, the N-alkoxymethyl amide groups. The extent of cure or crosslinking is typically measured as resistance to solvents such as methyl ethyl ketone (MEK). The test is performed as described in ASTM D-540293. The number of double rubs, one back and forth motion, is reported. This test is often referred to as "MEK Resistance". Accordingly, the (meth)acrylic polymer and crosslinking agent (inclusive of self-curing (meth)acrylic polymers and (meth)acrylic polymers with separately added crosslinking agents) is isolated from the binder composition, deposited as a film and heated for the temperature and time that the binder film is heated. The film is measured for MEK Resistance. Accordingly, a crosslinked (meth)acrylic polymer will have an MEK Resistance of at least 50, typically at least 75 double rubs. Also, the crosslinked (meth)acrylic polymer is solvent resistant to the solvents of the electrolyte mentioned below.

An electrical storage device can be manufactured by using the above electrodes. The electrical storage device, such as a battery, contains an electrolytic solution and can be manufactured by using parts such as a separator in accordance with a commonly used method. As a more specific manufacturing method, a negative electrode and a positive electrode are assembled together with a separator therebetween, the resulting assembly is rolled or bent in accordance with the shape of a battery and put into a battery container, an electrolytic solution is injected into the battery container, and the battery container is sealed up. The shape of the battery may be like a coin, button or sheet, cylindrical, square or flat.

The electrolytic solution may be liquid or gel, and an electrolytic solution which can serve effectively as a battery may be selected from among known electrolytic solutions which are used in electrical storage devices in accordance with the types of a negative electrode active material and a positive electrode active material.

The electrolytic solution may be a solution containing an electrolyte dissolved in a suitable solvent.

As the above electrolyte may be used a conventionally known lithium salt for lithium ion secondary batteries. Examples of the lithium salt include $LiClO_4$, $LiBF_4$, $LiPF_6$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $LiB(C_6H_5)_4$, $LiCF_3SO_3$, $LiCH_3SO_3$, $LiC_4F_9SO_3$, $Li(CF_3SO_2)_2N$, $LB_4CH_3SO_3Li$ and $CF_3SO_3Li$.

The solvent for dissolving the above electrolyte is not particularly limited and examples thereof include carbonate compounds such as propylene carbonate, ethylene carbonate, butylene carbonate, dimethyl carbonate, methyl ethyl carbonate and diethyl carbonate; lactone compounds such as γ-butyl lactone; ether compounds such as trimethoxymethane, 1,2-dimethoxyethane, diethyl ether, 2-ethoxyethane, tetrahydrofuran and 2-methyltetrahydrofuran; and sulfoxide compounds such as dimethyl sulfoxide.

The concentration of the electrolyte in the electrolytic solution is preferably 0.5 to 3.0 mole/L, more preferably 0.7 to 2.0 mole/L.

In the case of the counter electrode, the active material is generally a carbonaceous material as described above or other matrix material capable of being doped with lithium ions. The counter electrode is generally prepared as described above.

EXAMPLES

Illustrating the invention are the following examples that are not to be construed as limiting the invention to their details. All parts and percentages in the Examples as well as throughout the specification are by weight unless otherwise indicated.

In the following Examples, Examples 1-3 show the synthesis of various (meth)acrylic polymers that were used to disperse various polyvinylidene fluoride (PVDF) polymers in organic solvent.

Examples 4-12 show PVDF binder dispersions prepared with the (meth)acrylic polymer dispersants of Examples 1-3.

Examples 14-29 and 31 show slurries prepared with the PVDF binder dispersions of Examples 4-12, conductive carbon, electrically active lithium compound, and aminoplast. The Examples also show application of the slurries to a current collector serving as a positive electrode in a lithium ion battery.

Example 13 (comparative) shows a conventional binder of PVDF dissolved in N-methyl-2-pyrrolidone.

Example 30 (comparative) shows a slurry prepared with the PVDF binder of Example 13 and the application of the slurry to a current collector serving as a positive electrode in a lithium ion battery.

Example 1

A (meth)acrylic polymer with a theoretical glass transition temperature (Tg) of 58° C. was prepared as follows:

| | Ingredients | Amount (gram) |
|---|---|---|
| Charge 1: | methylether of propylene glycol | 658.0 |
| Charge 2: (premixed) | methyl methacrylate | 1121.1 |
| | ethyl acrylate | 435.9 |
| | hydroxyl ethyl acrylate | 33.2 |
| | methacrylic acid | 33.15 |
| Charge 3: (premixed) | tertiary amyl peroxy 2-ethyl hexyl carbonate | 33.8 |
| | methylether of propylene glycol | 169.6 |
| Charge 4: (premixed) | tertiary amyl peroxy 2-ethyl hexyl carbonate | 11.9 |
| | methylether of propylene glycol | 169.6 |
| Charge 5: | methylether of propylene glycol | 584.6 |

To a suitable reaction vessel equipped with a stirrer, reflux condenser, thermometer, heating mantle and nitrogen inlet, Charge 1 was added at ambient temperatures. The temperature was then increased to reflux (~150° C.), at which time the catalyst premix of Charge 3 was added over 185 minutes. Five (5) minutes after the start of Charge 3, Charge 2 was added over 180 minutes. Upon completion of Charges 2 and 3, Charge 4 was added over 60 minutes, followed by a hold for additional 60 minutes at reflux (~150° C.). Thereafter the reaction temperature was cooled to 40° C. and Charge 5 was added with a subsequent 30 minute hold period. The polymeric product thus formed had a theoretical solids of 52%.

Example 2

A (meth)acrylic polymer with a Tg of −12° C. was prepared the same way as the polymer of Example 1 except 30% of methyl methacrylate was replaced by 2-ethyl hexyl acrylate.

Example 3

A (meth)acrylic polymer with a Tg of −44° C. was prepared the same way as the polymer of Example 1 except 50% of methyl methacrylate was replaced by 2-ethyl hexyl acrylate.

Example 4

In a one-quart paint can, was placed 297.0 grams of isophorone and 70.0 grams of (meth)acrylic copolymer from Example 2. The resultant mixture was stirred vigorously using a Cowles blade while maintaining a modest vortex. This mixing was continued while 324 grams of polyvinylidene difluoride powder, Kynar HSV 900 (Arkema) was added in small portions. Mixing was continued for an additional 45 minutes after all the polyvinylidene difluoride powder was added.

Examples 5-9

By similar procedures, PVDF dispersions were prepared from combinations of (meth)acrylic copolymer and PVDF in a 10:90 weight ratio as shown in Table 1 below:

TABLE 1

Dispersion Details for Examples 5-9

| Example | (Meth)acrylic Copolymer | Polyvinylidene Difluoride |
|---|---|---|
| Example 5 | Example 1 | Blend[1] of: PVDF T-1 (Inner Mongolia Wanhao Fluorochemical Co., Ltd.) Kynar 500 (Arkema) Hylar 5000 (Solvay) |
| Example 6 | Example 1 | Kynar HSV 900 |
| Example 7 | Example 1 | PVDF T-1 (Inner Mongolia Wanhao Fluorochemical Co., Ltd.) |
| Example 8 | Example 2 | PVDF T-1 (Inner Mongolia Wanhao Fluorochemical Co., Ltd.) |
| Example 9 | Example 3 | PVDF T-1 (Inner Mongolia Wanhao Fluorochemical Co., Ltd.) |

[1]PVDF T-1/Kynar 500/Hylar 5000 weight ratio 36/32/32.

Example 10

A binder dispersion was prepared from PVDF dispersion Example 4 (200 grams) by adding the aminoplast crosslinker Cymel 303 (melamine-type from Cytec Industries, 2.34 grams) followed by mixing with a Cowles Blade for 30 minutes.

Example 11

A binder dispersion was prepared from PVDF dispersion Example 4 (200 grams) by adding Cymel 303 (11.18 grams) and (meth)acrylic copolymer Example 2 (76.5 grams) followed by mixing with a Cowles Blade for 30 minutes.

Example 12

A binder dispersion was prepared from PVDF dispersion Example 5 (296.3 grams) by adding Cymel 303 (3.66 grams) followed by mixing with a Cowles Blade for 30 minutes.

Example 13 Comparative

To a plastic container was added solvent grade N-methyl-2-pyrrolidone (Ashland, 570.7 grams). While stirring with a Cowles Blade, Kynar HSV 900 PVDF (29.3 grams) was added in portions. Stirring was continued until the PVDF was completely dissolved.

Example 14

To a plastic cup was added isophorone (41.0 grams), binder dispersion from Example 8 (2.16 grams), Cymel 303 (0.12 grams), (meth)acrylic copolymer from Example 2 (0.55 grams) and conductive carbon Super C65 (1.8 grams). This blend was placed in a dual-asymmetric centrifugal mixer and mixed at 2350 rpm for 5 minutes. Cathode active powder lithium iron phosphate (LFP) (14.4 grams) was added to this mixed blend, and the resulting combination was subjected to a second mixing in a dual-asymmetric centrifugal mixer at 2350 rpm for 5 minutes to produce a formulated slurry.

A wet film was prepared on pre-cleaned aluminum foil by a draw-down application of this formulated slurry using a doctor blade. This wet film was heated in an oven to a maximum temperature of 190° C. for at least 10 minutes. After cooling, an average dry film thickness (DFT) of 46 microns was determined from five measurements with a micrometer.

Battery performance data for this coating is shown in Table 3.

Example 15

To a plastic cup was added isophorone (41.0 grams), binder dispersion from Example 8 (2.75 grams), Cymel 303 (0.02 grams) and Super C65 (1.8 grams). This blend was placed in a dual-asymmetric centrifugal mixer and mixed at 2350 rpm for 5 minutes. LFP (14.4 grams) was added to this mixed blend, and the resulting combination was subjected to a second mixing in a dual-asymmetric centrifugal mixer at 2350 rpm for 5 minutes to produce a formulated slurry.

A wet film was prepared on pre-cleaned aluminum foil by a draw-down application of this formulated slurry using a doctor blade. This wet film was heated in an oven to a maximum temperature of 246° C. for at least 10 minutes. After cooling, an average DFT of 46 microns was determined from five measurements with a micrometer.

Battery performance data for this coating is shown in Table 3.

Example 16

To a plastic cup was added isophorone (78.5 grams), binder dispersion from Example 5 (3.34 grams) and Super C65 (2.0 grams). This blend was placed in a dual-asymmetric centrifugal mixer and mixed at 2350 rpm for 5 minutes. LFP (16.1 grams) was added to this mixed blend, and the resulting combination was subjected to a second mixing in a dual-asymmetric centrifugal mixer at 2350 rpm for 5 minutes to produce a formulated slurry.

A wet film was prepared on pre-cleaned aluminum foil by a draw-down application of this formulated slurry using a doctor blade. This wet film was heated in an oven to a maximum temperature of 120° C. for at least 10 minutes. After cooling, an average DFT of 57 microns was determined from five measurements with a micrometer.

Battery performance data for this coating is shown in Table 3.

Example 17

To a plastic cup was added isophorone (54.0 grams), binder dispersion from Example 5 (4.04 grams) and Super C65 (2.4 grams). This blend was placed in a dual-asymmetric centrifugal mixer and mixed at 2350 rpm for 5 minutes. LFP (19.5 grams) was added to this mixed blend, and the resulting combination was subjected to a second mixing in a dual-asymmetric centrifugal mixer at 2350 rpm for 5 minutes to produce a formulated slurry.

A wet film was prepared on pre-cleaned aluminum foil by a draw-down application of this formulated slurry using a doctor blade. This wet film was heated in an oven to a maximum temperature of 246° C. for at least 10 minutes. After cooling, an average DFT of 71 microns was determined from five measurements with a micrometer.

Battery performance data for this coating is shown in Table 3.

Example 18

To a plastic cup was added isophorone (40.7 grams), binder dispersion from Example 6 (3.08 grams), Cymel 303 (0.35 grams) and Super C65 (1.8 grams). This blend was placed in a dual-asymmetric centrifugal mixer and mixed at 2350 rpm for 5 minutes. LFP (14.4 grams) was added to this mixed blend, and the resulting combination was subjected to a second mixing in a dual-asymmetric centrifugal mixer at 2350 rpm for 5 minutes to produce a formulated slurry.

A wet film was prepared on pre-cleaned aluminum foil by a draw-down application of this formulated slurry using a doctor blade. This wet film was heated in an oven to a maximum temperature of 246° C. for at least 10 minutes. After cooling, an average DFT of 47 microns was determined from five measurements with a micrometer.

Battery performance data for this coating is shown in Table 3.

Example 19

To a plastic cup was added isophorone (38.2 grams), binder dispersion from Example 6 (1.80 grams), Cymel 303 (0.02 grams) and Super C65 (1.1 grams). This blend was placed in a dual-asymmetric centrifugal mixer and mixed at 2350 rpm for 5 minutes. LFP (18.9 grams) was added to this mixed blend, and the resulting combination was subjected to a second mixing in a dual-asymmetric centrifugal mixer at 2350 rpm for 5 minutes to produce a formulated slurry.

A wet film was prepared on pre-cleaned aluminum foil by a draw-down application of this formulated slurry using a doctor blade. This wet film was heated in an oven to a maximum temperature of 246° C. for at least 10 minutes. After cooling, an average DFT of 42 microns was determined from five measurements with a micrometer.

Battery performance data for this coating is shown in Table 3.

Example 20

To a plastic cup was added isophorone (41.1 grams), binder dispersion from Example 12 (2.67 grams) and Super C65 (1.8 grams). This blend was placed in a dual-asymmetric centrifugal mixer and mixed at 2350 rpm for 5 minutes. LFP (14.4 grams) was added to this mixed blend, and the resulting combination was subjected to a second mixing in a dual-asymmetric centrifugal mixer at 2350 rpm for 5 minutes to produce a formulated slurry.

A wet film was prepared on pre-cleaned aluminum foil by a draw-down application of this formulated slurry using a doctor blade. This wet film was heated in an oven to a maximum temperature of 246° C. for at least 10 minutes. After cooling, an average DFT of 44 microns was determined from five measurements with a micrometer.

Battery performance data for this coating is shown in Table 3.

Example 21

To a plastic cup was added isophorone (38.5 grams), binder dispersion from Example 12 (1.56 grams) and Super C65 (1.1 grams). This blend was placed in a dual-asymmetric centrifugal mixer and mixed at 2350 rpm for 5 minutes. LFP (18.9 grams) was added to this mixed blend, and the resulting combination was subjected to a second mixing in a dual-asymmetric centrifugal mixer at 2350 rpm for 5 minutes to produce a formulated slurry.

A wet film was prepared on pre-cleaned aluminum foil by a draw-down application of this formulated slurry using a doctor blade. This wet film was heated in an oven to a maximum temperature of 246° C. for at least 10 minutes. After cooling, an average DFT of 43 microns was determined from five measurements with a micrometer.

13

Battery performance data for this coating is shown in Table 3.

Example 22

To a plastic cup was added isophorone (41.0 grams), binder dispersion from Example 8 (2.72 grams), Cymel 303 (0.04 grams) and Super C65 (1.8 grams). This blend was placed in a dual-asymmetric centrifugal mixer and mixed at 2350 rpm for 5 minutes. LFP (14.4 grams) was added to this mixed blend, and the resulting combination was subjected to a second mixing in a dual-asymmetric centrifugal mixer at 2350 rpm for 5 minutes to produce a formulated slurry.

A wet film was prepared on pre-cleaned aluminum foil by a draw-down application of this formulated slurry using a doctor blade. This wet film was heated in an oven to a maximum temperature of 246° C. for at least 10 minutes. After cooling, an average DFT of 47 microns was determined from five measurements with a micrometer.

Battery performance data for this coating is shown in Table 3.

Example 23

To a plastic cup was added isophorone (40.9 grams), binder dispersion from Example 8 (2.16 grams), Cymel 303 (0.06 grams), (meth)acrylic copolymer from Example 2 (0.66 grams) and Super C65 (1.8 grams). This blend was placed in a dual-asymmetric centrifugal mixer and mixed at 2350 rpm for 5 minutes. LFP (14.4 grams) was added to this mixed blend, and the resulting combination was subjected to a second mixing in a dual-asymmetric centrifugal mixer at 2350 rpm for 5 minutes to produce a formulated slurry.

A wet film was prepared on pre-cleaned aluminum foil by a draw-down application of this formulated slurry using a doctor blade. This wet film was heated in an oven to a maximum temperature of 246° C. for at least 10 minutes. After cooling, an average DFT of 44 microns was determined from five measurements with a micrometer.

Battery performance data for this coating is shown in Table 3.

Example 24

To a plastic cup was added isophorone (41.0 grams), binder dispersion from Example 8 (2.16 grams), Cymel 303 (0.12 grams), (meth)acrylic copolymer from Example 2 (0.55 grams) and Super C65 (1.8 grams). This blend was placed in a dual-asymmetric centrifugal mixer and mixed at 2350 rpm for 5 minutes. LFP (14.4 grams) was added to this mixed blend, and the resulting combination was subjected to a second mixing in a dual-asymmetric centrifugal mixer at 2350 rpm for 5 minutes to produce a formulated slurry.

A wet film was prepared on pre-cleaned aluminum foil by a draw-down application of this formulated slurry using a doctor blade. This wet film was heated in an oven to a maximum temperature of 246° C. for at least 10 minutes. After cooling, an average DFT of 46 microns was determined from five measurements with a micrometer.

Battery performance data for this coating is shown in Table 3.

Example 25

To a plastic cup was added isophorone (41.0 grams), binder dispersion from Example 8 (2.72 grams), aminoplast crosslinker Cymel 1123 (benzoguanamine-type from Cytec Industries) (0.04 grams), and Super C65 (1.8 grams). This blend was placed in a dual-asymmetric centrifugal mixer and mixed at 2350 rpm for 5 minutes. LFP (14.4 grams) was added to this mixed blend, and the resulting combination was subjected to a second mixing in a dual-asymmetric centrifugal mixer at 2350 rpm for 5 minutes to produce a formulated slurry.

A wet film was prepared on pre-cleaned aluminum foil by a draw-down application of this formulated slurry using a doctor blade. This wet film was heated in an oven to a maximum temperature of 246° C. for at least 10 minutes. After cooling, an average DFT of 46 microns was determined from five measurements with a micrometer.

Battery performance data for this coating is shown in Table 3.

Example 26

To a plastic cup was added isophorone (54.1 grams), binder dispersion from Example 7 (3.88 grams), Cymel 303 (0.02 grams) and Super C65 (2.4 grams). This blend was placed in a dual-asymmetric centrifugal mixer and mixed at 2350 rpm for 5 minutes. LFP (19.5 grams) was added to this mixed blend, and the resulting combination was subjected to a second mixing in a dual-asymmetric centrifugal mixer at 2350 rpm for 5 minutes to produce a formulated slurry.

A wet film was prepared on pre-cleaned aluminum foil by a draw-down application of this formulated slurry using a doctor blade. This wet film was heated in an oven to a maximum temperature of 246° C. for at least 10 minutes. After cooling, an average DFT of 94 microns was determined from five measurements with a micrometer.

Battery performance data for this coating is shown in Table 3.

Example 27

To a plastic cup was added isophorone (54.1 grams), binder dispersion from Example 9 (3.88 grams), Cymel 303 (0.02 grams) and Super C65 (2.4 grams). This blend was placed in a dual-asymmetric centrifugal mixer and mixed at 2350 rpm for 5 minutes. LFP (19.5 grams) was added to this mixed blend, and the resulting combination was subjected to a second mixing in a dual-asymmetric centrifugal mixer at 2350 rpm for 5 minutes to produce a formulated slurry.

A wet film was prepared on pre-cleaned aluminum foil by a draw-down application of this formulated slurry using a doctor blade. This wet film was heated in an oven to a maximum temperature of 246° C. for at least 10 minutes. After cooling, an average DFT of 92 microns was determined from five measurements with a micrometer.

Battery performance data for this coating is shown in Table 3.

Example 28

To a plastic cup was added isophorone (34.7 grams), binder dispersion from Example 11 (3.74 grams) and Super C65 (2.4 grams). This blend was placed in a dual-asymmetric centrifugal mixer and mixed at 2350 rpm for 5 minutes. LFP (19.2 grams) was added to this mixed blend, and the resulting combination was subjected to a second mixing in a dual-asymmetric centrifugal mixer at 2350 rpm for 5 minutes to produce a formulated slurry.

A wet film was prepared on pre-cleaned aluminum foil by a draw-down application of this formulated slurry using a doctor blade. This wet film was heated in an oven to a maximum temperature of 246° C. for at least 10 minutes. After cooling, an average DFT of 41 microns was determined from five measurements with a micrometer.

Example 29

To a plastic cup was added isophorone (34.4 grams), binder dispersion from Example 10 (4.01 grams) and Super C65 (2.4 grams). This blend was placed in a dual-asymmetric centrifugal mixer and mixed at 2350 rpm for 5 minutes. LFP (19.2 grams) was added to this mixed blend, and the resulting combination was subjected to a second mixing in a dual-asymmetric centrifugal mixer at 2350 rpm for 5 minutes to produce a formulated slurry.

A wet film was prepared on pre-cleaned aluminum foil by a draw-down application of this formulated slurry using a doctor blade. This wet film was heated in an oven to a maximum temperature of 246° C. for at least 10 minutes. After cooling, an average DFT of 44 microns was determined from five measurements with a micrometer.

Example 30 Comparative

To a plastic cup was added NMP (32.8 grams), binder from Example 13 (32.79 grams) and Super C65 (1.6 grams). This blend was placed in a dual-asymmetric centrifugal mixer and mixed at 2350 rpm for 5 minutes. LFP (12.8 grams) was added to this mixed blend, and the resulting combination was subjected to a second mixing in a dual-asymmetric centrifugal mixer at 2350 rpm for 5 minutes to produce a formulated slurry.

A wet film was prepared on pre-cleaned aluminum foil by a draw-down application of this formulated slurry using a doctor blade. This wet film was heated in an oven to a maximum temperature of 120° C. for at least 10 minutes. After cooling, an average DFT of 41 microns was determined from five measurements with a micrometer.

Battery performance data for this coating is shown in Table 3.

Example 31

To a plastic cup was added isophorone (41 grams), binder dispersion from Example 8 (2.16 grams), Cymel 1123, (0.12 grams), (meth)acrylic copolymer from Example 2 (0.55 grams) and Super C65 (1.8 grams). This blend was placed in a dual-asymmetric centrifugal mixer and mixed at 2350 rpm for 5 minutes. LFP (14.4 grams) was added to this mixed blend, and the resulting combination was subjected to a second mixing in a dual-asymmetric centrifugal mixer at 2350 rpm for 5 minutes to produce a formulated slurry.

A wet film was prepared on pre-cleaned aluminum foil by a draw-down application of this formulated slurry using a doctor blade. This wet film was heated in an oven to a maximum temperature of 246° C. for at least 10 minutes. After cooling, an average DFT of 46 microns was determined from five measurements with a micrometer.

Battery performance data for this coating is shown in Table 3.

Table 2 below summarizes the compositions of Examples 14-31.

TABLE 2

Summary of Examples 14-31

| Example # Rev3 | (Meth)- Acrylic Polymer Example # | Tg (° C.) | PVDF Example # | Aminoplast ID | (Meth)acrylic/ PVDF/ aminoplast weight ratio | (Meth)- acrylic/ PVDF weight ratio | (Meth)acrylic/ aminoplast weight ratio | total resin solids | Wt % LFP in solids | Wt % solids conductive carbon | Cure temp. (° C.) | DFT (μm) | Testing Temp. (° C.) |
|---|---|---|---|---|---|---|---|---|---|---|---|---|---|
| 14 | Example 2 | −12 | 8 | Cymel 303 | 23:70:7 | 30:70 | 5 | 10 | 80 | 10 | 190 | 46 | 25 |
| 15 | Example 2 | −12 | 8 | Cymel 303 | 10:89:1 | 10:90 | 10 | 10 | 80 | 10 | 246 | 46 | 25 |
| 16 | Example 1 | 58 | 5 | Cymel 303 | 25:70:5 | 30:70 | 5 | 10 | 80 | 10 | 120 | 57 | 25 |
| 17 | Example 1 | 58 | 5 | Cymel 303 | 25:70:5 | 30:70 | 5 | 10 | 80 | 10 | 246 | 71 | 25, 0 |
| 18 | Example 1 | 58 | 6 | Cymel 303 | 10:88:2 | 10:90 | 5 | 10 | 80 | 10 | 246 | 47 | 25 |
| 19 | Example 1 | 58 | 6 | Cymel 303 | 10:88:2 | 10:90 | 5 | 5 | 90 | 5 | 246 | 42 | 25 |
| 20 | Example 1 | 58 | 12 | Cymel 303 | 10:88:2 | 10:90 | 5 | 10 | 80 | 10 | 246 | 44 | 25 |
| 21 | Example 1 | 58 | 12 | Cymel 303 | 10:88:2 | 10:90 | 5 | 5 | 90 | 5 | 246 | 43 | 25 |
| 22 | Example 2 | −12 | 8 | Cymel 303 | 10:88:2 | 10:90 | 5 | 10 | 80 | 10 | 246 | 47 | 25, 0 |
| 23 | Example 2 | −12 | 8 | Cymel 303 | 27:70:3 | 30:70 | 10 | 10 | 80 | 10 | 246 | 44 | 25 |
| 24 | Example 2 | −12 | 8 | Cymel 303 | 23:70:7 | 30:70 | 5 | 10 | 80 | 10 | 246 | 46 | 25, 0 |
| 25 | Example 2 | −12 | 8 | Cymel 1123 | 10:88:2 | 10:90 | 5 | 10 | 80 | 10 | 246 | 46 | 25 |
| 26 | Example 1 | 58 | 7 | Cymel 303 | 10:89:1 | 10:90 | 5 | 10 | 80 | 10 | 246 | 94 | 25 |
| 27 | Example 3 | −44 | 9 | Cymel 303 | 10:89:1 | 10:90 | 5 | 10 | 80 | 10 | 246 | 92 | 25 |
| 30 | — | — | 13 | — | — | — | — | 10 | 80 | 10 | 120 | 41 | 25, 0 |
| 31 | Example 2 | −12 | 8 | Cymel 1123 | 23:70:7 | 30:70 | 5 | 10 | 80 | 10 | 246 | 46 | 25 |

TABLE 3

Discharge data for coin-cell batteries prepared from Examples. Table 3 shows cell specific capacity (milliamp-hours per gram) for various discharge C-rates (per hour).

| | | Discharge C-Rate (hour$^{-1}$) | | | | | | | % Capacity Retention after about 50 cycles at |
|---|---|---|---|---|---|---|---|---|---|
| Example | Temperature | 0.2 | 0.4 | 0.8 | 1.6 | 3.2 | 6.4 | 1.0 | C-rate of 1.0 |
| 14 | 25° C. | 168.4 | 166.5 | 162.7 | 154.8 | 134.8 | 78.5 | 159.0 | 90.8 |
| 15 | 25° C. | 158.0 | 156.1 | 153.2 | 147.5 | 135.2 | 106.5 | 151.1 | 94.8 |

TABLE 3-continued

Discharge data for coin-cell batteries prepared from Examples. Table 3 shows cell specific capacity (milliamp-hours per gram) for various discharge C-rates (per hour).

| Example | Temperature | Discharge C-Rate (hour$^{-1}$) | | | | | | | % Capacity Retention after about 50 cycles at C-rate of 1.0 |
|---|---|---|---|---|---|---|---|---|---|
| | | 0.2 | 0.4 | 0.8 | 1.6 | 3.2 | 6.4 | 1.0 | |
| 16 | 25° C. | 156.2 | 153.4 | 147.7 | 135.4 | 110.3 | 56.4 | 142.9 | 90.3 |
| 17 | 25° C. | 151.6 | 149.3 | 145.1 | 135.5 | 116.1 | 73.1 | 142.0 | 94.2 |
| 17 | 0° C. | 142.2 | 135.7 | 125.8 | 111.2 | 91.0 | 23.5 | 122.1 | 97.1 |
| 18 | 25° C. | 160.6 | 159.2 | 156.3 | 151.3 | 142.6 | 124.8 | 155.3 | 99.6 |
| 19 | 25° C. | 165.2 | 163.6 | 160.1 | 151.2 | 119.5 | 0.0 | 157.2 | 97.4 |
| 20 | 25° C. | 167.4 | 166.1 | 163.1 | 157.3 | 146.4 | 124.3 | 162.0 | 99.1 |
| 21 | 25° C. | 158.4 | 156.1 | 152.0 | 130.8 | 10.9 | 0.0 | 142.9 | 3.3 |
| 22 | 25° C. | 158.2 | 156.2 | 153.2 | 147.6 | 136.8 | 114.2 | 151.3 | 96.2 |
| 22 | 0° C. | 151.3 | 142.9 | 131.0 | 120.9 | 101.2 | 68.9 | 127.1 | 97.3 |
| 23 | 25° C. | 159.9 | 158.2 | 154.6 | 146.9 | 126.3 | 74.0 | 151.6 | 92.6 |
| 24 | 25° C. | 166.2 | 164.5 | 161.0 | 155.2 | 143.8 | 120.5 | 159.6 | 96.1 |
| 24 | 0° C. | 148.8 | 139.4 | 125.5 | 117.2 | 96.7 | 58.3 | 123.3 | 96.2 |
| 25 | 25° C. | 165.9 | 164.1 | 160.9 | 155.1 | 142.5 | 113.1 | 159.1 | 95.0 |
| 26 | 25° C. | 156.9 | 154.8 | 151.4 | 144.6 | 130.5 | 93.8 | 149.2 | 96.0 |
| 27 | 25° C. | 152.4 | 150.4 | 146.6 | 139.1 | 119.9 | 47.8 | 143.9 | 94.2 |
| 30 | 25° C. | 154.9 | 152.9 | 148.8 | 140.1 | 122.4 | 89.4 | 144.2 | 90.2 |
| 30 | 0° C. | 145.0 | 137.9 | 126.4 | 113.9 | 95.8 | 69.9 | 123.1 | 98.4 |
| 31 | 25° C. | 166.0 | 164.4 | 161.0 | 154.0 | 133.4 | 11.6 | 158.4 | 91.8 |

The dual-asymmetric centrifugal mixer that was used in the examples above was a model DAC 400.1 FVZ from FlackTec, Inc. or model ARM-310 Thinky USA, Inc. The electrically active lithium compound was lithium iron phosphate Life Power P2 lot #1110GY195 from Phostech Lithium, Inc. Aluminum foil alloy 1085 from Targray was cleaned with acetone before the slurry was applied. Formulations were applied as wet films on the aluminum foil using a large automatic film coater (MSK-AFA-II from MTI Corporation) using an adjustable doctor blade at a rate of 89 mm/sec. Wet coated foils were placed in an oven for battery performance.

The dry coated foils were then passed through a roll calendar press (MTI Corporation) to achieve 25-30% compression. After vacuum drying, two coin-type half-cell batteries per dry coated foil were assembled using lithium metal as the anode and one-molar LiPF6 in ethylene carbonate, diethyl carbonate and dimethyl carbonate solvents as the electrolyte. The coin cell batteries were then tested on a battery tester (Arbin Instruments) using a potential window of 4.1-2.5 Volts for 5 cycles each at currents corresponding to 0.2 C, 0.4 C, 0.8 C, 1.6 C, 3.2 C and 6.4 C charge/discharge rates, followed by 50 cycles at the current corresponding to a 1 C rate. Discharge capacity in milliamp-hours per gram of lithium iron phosphate was calculated from the average of the first 5 cycles for each C-rate. Discharge capacity averages from the higher capacity coin-type half-cell of the two replicate cells for a given dry coated foil are reported in Table 3. Capacity retention was calculated from the quotient of the discharge capacity after the first charge-discharge cycle at 1 C and the last charge-discharge cycle at 1 C and reported as percentage according to the equation: 100×first cycle capacity/last cycle capacity.

Note that "C-rate" refers to a current value that is required to fully discharge a cell having a constant electric capacitance in a time period equal to the inverse of the C-rate value in hours. For example, discharge capacity at 0.2 C refers to dry coated film capacity in milliamp-hours per gram of lithium iron phosphate at a current value required to fully discharge the battery in 5 hours. Similarly discharge capacity at 1 C refers to dry coated film capacity in milliamp-hours per gram of lithium iron phosphate at a current value required to fully discharge the battery in 1 hour.

Some observations from the Examples:

1. The PVDF binder dispersed with the (meth)acrylic binder gives better battery performance than the control. Example 30 is a standard control in which the binder is battery grade PVDF dissolved in NMP. Example 18 uses a (meth)acrylic polymer to disperse the same battery grade PVDF in isophorone and results in a better performing battery; higher capacity at high C-rate; and better cycle life retention.

2. The film build can be varied. Most of the examples use roughly 50 µm thick dry films. Example 17 shows that electrode coatings can be made up to 71 µm thick. Examples 26 and 27 show that electrode coatings can be made up to 92-94 µm thick.

3. Higher cure temperature gives better performance. Examples 15 and 17 show improved battery cycle life (>94% capacity retention) when the cathode coating is cured at 246° C. Coating example 16 cured at 120° C. and coating example 14 cured at 190° C. have only 90% capacity retention. It is believed the higher temperature helps the (meth)acrylic polymer fuse with the PVDF and provides higher level of crosslinking of the (meth)acrylic polymer.

4. The cathode active concentration can be varied. Examples 18 and 19 show 80 and 90% LFP active concentration respectively.

5. The (meth)acrylic polymer level and (meth)acrylic/aminoplast weight ratio are important to battery performance. Using a low Tg (meth)acrylic polymer and at high (meth)acrylic/aminoplast weight ratio, low (meth)acrylic polymer level is better (Example 15 is better than Example 23). At low (meth)acrylic/aminoplast weight ratio, high (meth)acrylic polymer is better (Example 24 is better than Example 22). Low (meth)acrylic polymer/aminoplast is better at any given (meth)acrylic polymer level (Example 22 is better than Example 15, and Example 24 is better than Example 23). Using a high Tg (meth)acrylic polymer at low (meth)acrylic polymer/aminoplast weight ratio, low (meth) acrylic polymer level is better (Example 20 is better than Example 17).

6. Aminoplast type matters at high (meth)acrylic polymer level. At low (meth)acrylic polymer/aminoplast weight ratio and low (meth)acrylic polymer level, melamine-type crosslinkers (Cymel 303) or benzoguanidine-type crosslinkers (Cymel 1123) are nearly equivalent (Examples 22 and 25). At low (meth)acrylic polymer/aminoplast weight ratio and high (meth)acrylic polymer level, melamine-type crosslinker is better than benzoguanidine-type (Examples 24 and 31).

7. High MW PVDF gives better results. Example 19 teaches that high MW battery grade PVDF yields better battery performance at high active material load (90%) compared to the blend of conventional PVDF used in Example 21. Example 19: 119.5 mAh/g @3.2 C discharge, 97.4% capacity retention after 50 cycles at 1 C discharge. Example 21: 10.9 mAh/g @3.2 C discharge, 3.3% capacity retention after 50 cycles at 1 C discharge.

8. Low Tg is better for low temperature battery performance. The control using PVDF dissolved in NMP (Example 30) shows 69.9 mAh/g when tested at 0° C. The following examples show that the low Tg (meth)acrylic dispersions in the present invention give better performance when battery capacity is measured at 0° C. By using (meth)acrylic with Tg of −12, we can get cold temperature performance approaching the control:

Example 30 is the control made with PVDF dissolved in NMP—Capacity 69.9 mAh/g @6.4 C discharge.

Example 24 is the 70:30 PVDF:(meth)acrylic Tg=−12° C.—Capacity 58.3 mAh/g @6.4 C discharge.

Whereas particular embodiments of this invention have been described above for purposes of illustration, it will be evident to those skilled in the art that numerous variations of the details of the present invention may be made without departing from the invention as defined in the appended claims.

Although various embodiments of the invention have been described in terms of "comprising", embodiments consisting essentially of or consisting of are also within the scope of the present invention.

The invention claimed is:

1. A binder composition comprising a dispersion of:
    (a) a polyvinylidene fluoride polymer dispersed in an organic dispersion medium with
    (b) a (meth)acrylic polymer dispersant having a glass transition temperature of 100° C. or less, and
    (c) a crosslinking agent,
    wherein the (meth)acrylic polymer is prepared from a mixture of monomers comprising 30-90 percent by weight of alkyl esters of (meth)acrylic acid containing from 1 to 3 carbon atoms in the alkyl group, the percent by weight based on total monomer weight.

2. The binder composition of claim 1 in which the (meth)acrylic polymer has a glass transition temperature of −50 to +70° C.

3. The binder composition of claim 1 in which the (meth)acrylic polymer has a glass transition temperature less than 0° C.

4. The binder composition of claim 1 in which the mixture of monomers further comprises one or more active hydrogen group-containing (meth)acrylic monomers.

5. The binder composition of claim 4 in which the active hydrogen groups comprise carboxylic acid groups.

6. The binder composition of claim 5 in which the active hydrogen groups additionally comprise hydroxyl groups.

7. The binder composition of claim 4 in which the (meth)acrylic polymer is self-crosslinking in that the mixture of monomers contains a monomer that contains reactive groups that are reactive with the active hydrogen groups or are reactive with themselves.

8. The binder composition of claim 7 in which the reactive groups comprise N-alkoxymethyl (meth)acrylamide groups and/or blocked isocyanate groups.

9. The binder composition of claim 4, wherein the crosslinking agent is reactive with the active hydrogen groups.

10. The binder composition of claim 9 in which the crosslinking agent comprises aminoplast, blocked polyisocyanates and/or polyepoxides.

11. The binder composition of claim 1 in which the polyvinylidene fluoride polymer is present in amounts of 50 to 98 percent by weight; the (meth)acrylic polymer is present in amounts of 2 to 50 percent by weight and the crosslinking agent is present in amounts of 1 to 15 percent by weight, the percentages by weight being based on resin solids.

12. The binder composition of claim 1, wherein the mixture of monomers further comprises:
    (i) 2 to 50% by weight of an alpha, beta-ethylenically unsaturated carboxylic acid; and
    (ii) up to 30% by weight of a hydroxyalkyl ester of (meth)acrylic acid.

13. The binder composition of claim 1 in which the organic dispersing medium comprises ketones, esters or ethers, including mixtures thereof.

14. The binder composition of claim 13 which has a resin solids content of 30 to 80 percent by weight, based on the total weight of the binder composition.

15. The binder composition of claim 1 in which the organic dispersion medium is free of N-methyl-2-pyrrolidone.

16. The binder composition of claim 1, wherein the weight ratio of the (meth)acrylic polymer dispersant to the crosslinking agent is at least 5:1.

17. An electrode slurry comprising:
    (a) an electrically active material capable of lithium intercalation/deintercalation, and
    (b) the binder composition of claim 1.

18. The electrode slurry of claim 17 in which (a) comprises $LiCoO_2$, $LiNiO_2$, $LiFePO_4$, $LiCoPO_4$, $LiMnO_2$, $LiMn_2O_4$, $Li(NiMnCo)O_2$, $Li(NiCoAl)O_2$, carbon-coated $LiFePO_4$, or mixtures thereof.

19. The electrode slurry of claim 17, further comprising (c) a conductive agent.

20. The electrode slurry of claim 19 in which (c) comprises graphite, activated carbon, acetylene black, furnace black or graphene.

21. The electrode slurry of claim 17, wherein the polyvinylidene fluoride polymer is present in amounts of 50 to 98 percent by weight, the (meth)acrylic polymer is present in amounts of 2 to 50 percent by weight and the crosslinking agent is present in amounts of 1 to 15 percent by weight, the percentages by weight being based on resin solids.

22. The electrode slurry of claim 17 in which the organic dispersion medium comprises ketones, esters or ethers, including mixtures thereof.

23. An electrode slurry comprising:
    (a) a conductive agent, and
    (b) the binder composition of claim 1.

* * * * *